United States Patent [19]

Wall

[11] 3,872,211

[45] Mar. 18, 1975

[54] CALCINATION OF HIGH MOISTURE CONTENT PHOSPHATE ROCK

[75] Inventor: Clarence J. Wall, Westport, Conn.

[73] Assignee: Dorr-Oliver Incorporated, Stamford, Conn.

[22] Filed: Nov. 7, 1972

[21] Appl. No.: 304,350

[52] U.S. Cl. .............................................. 423/167
[51] Int. Cl........ C01f 1/00, C01f 5/00, C01f 11/00, C22b 3/00, C22b 79/00
[58] Field of Search ........... 423/167, 188, 177, 316, 423/317, 318, 321, 1, 659; 432/14, 15, 17, 48, 58

[56]  References Cited
UNITED STATES PATENTS 2,670,193  2/1954  Pyzel.................................... 432/15

3,266,788  8/1966  Jukkola................................. 432/15

OTHER PUBLICATIONS

Chemical Engineering (magazine), "Where Fluidized Solids Stand Today," R. J. Priestly, July 9, 1962, pp. 125–132; particularly Fig. 7a, p. 131.

Primary Examiner—Edward J. Meros
Assistant Examiner—Eugene T. Wheelock
Attorney, Agent, or Firm—H. M. Snyder; Burtsell J. Kearns; Theodore M. Jablon

[57]  ABSTRACT

Phosphate rock having a moisture content of 12% or more is prepared for calcination by drying and heating in a fluid bed preheat compartment using the off-gases of a calciner which have been cooled to a predetermined level by the addition of the off-gases of an intermediate fluid bed product precooler.

7 Claims, 1 Drawing Figure

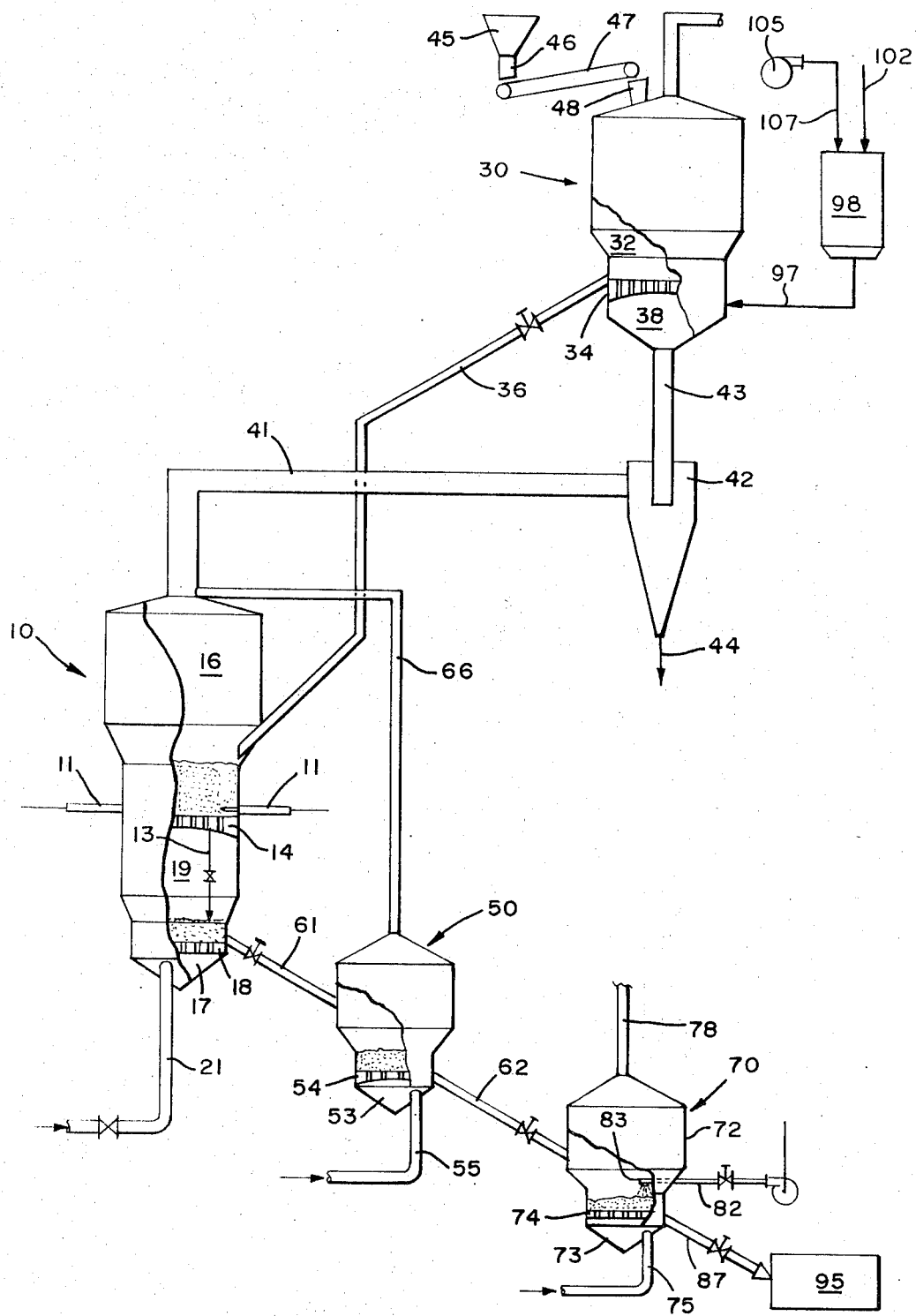

CALCINATION OF HIGH MOISTURE CONTENT PHOSPHATE ROCK

This invention is directed to improvements in the process for the fluid bed calcination of phosphate rock and, more particularly, to a method for drying and heating high-moisture content phosphate rock prior to calcination.

Phosphate rock is found in many places in the world in deposits of varying composition. In order to prepare the phosphate rock for making phosphoric acid, which is then utilized in subsequent reactions; i.e., the manufacture of triple superphosphate and for other valuable products, it is sometimes necessary to beneficiate the phosphate rock by removing certain of the impurities. Very often a substantial amount of limestone ($CaCO_3$) and organic matter are associated with the phosphate rock and a calcining operation is indicated to burn the organic matter and to drive off $CO_2$ from the limestone, leaving lime (CaO), which may then be removed by slaking and separating. In this way, a substantial beneficiation of the phosphate rock is effected.

In the preparation of phosphate rock for calcination, it is necessary to first remove the moisture content of the rock. Generally speaking, this moisture can be removed by heating the rock ("preheating") to evaporate the moisture. If some of the moisture is present in the form of "slimes" (largely clay-like suubstances), a treatment such as filtration may be employed to separate and remove such substances prior to preheating especially if the amount of slimes would tend to overload the evaporative capacity of the preheating stage.

In the fluid bed calcination of phosphate rock, three fluid beds are commonly used. The upper or top fluid bed serves to dry and preheat the phosphate rock feed material. The middle bed serves to calcine the phosphate rock and also acts as a fuel combustion compartment. The bottom or lower bed serves to partially cool the hot calcined phosphate rock to a temperature of about 540°C (1,400°F) and to preheat the incoming fluidizing air. A hot cyclone is generally required between the calcining compartment and the feed preheating compartment to remove solids and dust from the calciner off-gases. A separate fluid bed employing water sprays may be used for final cooling of the calcines to a temperature of about 120°C (248°F) or less. As a rule, it is necessary to partially cool the calcining compartment off-gases ahead of the hot cyclone so as to minimize both scale formation and plugging of the hot cyclone and of the feed preheating compartment constriction plate and tuyeres. Cooling of the calciner offgases to the temperature range from about 600°C (1,112°F) to about 700°C (1,292°F) ahead of the hot cyclone is usually found advantageous and is generally accomplished by injecting air at ambient temperature into the conduit carrying the hot calcine off-gases, or even by spraying water directly into the calcining compartment. The fluid bed system as described above is quite efficient and suitable for most phosphate rocks except in those cases where the phosphate rock feed cannot be dewatered to 12% or less by weight of water. With phosphate rock feed having substantially more than 12% by weight of water, the sensible heat in the calciner off-gases is not sufficient to provide the heat required to evaporate the water and heat the feed solids in the feed preheating compartments to the required minimum fluid bed feed preheat temperature of 120°C (248°F). In the past, in such a situation, the solution to the problem of high feed moisture was to increase the air flow to the whole system, that is, to all three compartments of the calcining system, thereby increasing the gas flow to the feed preheating compartment so as to provide the required heat for moisture evaporation and for heating the feed solids to 120°C. This solution, however, is quite wasteful in that it requires more fuel for the calcining compartment, a larger fluidizing air blower and larger product cooling and calcining compartments.

It is an object of the invention to provide in a calcination process an improved method for drying and heating high moisture content phosphate rock prior to calcination using the gases generated in the process.

Other objects and advantages will become apparent from the following description taken in conjunction with the accompanying drawing in which:

The FIGURE is a diagramatic representation of a fluidized bed calcination process utilizing the present invention.

Generally speaking, the invention is directed to a process in which air employed to partially cool the calcine product in a fluidized bed is then utilized to aid in drying and heating high moisture content phosphate rock before it enters the calcining reactor. In carrying out the process, the heated gases from a precooler are mixed with the off-gases from the calcining compartment to cool the said gases to a predetermined temperature range at which they may be introduced as the fluidizing gas for the preheat compartment without producing undesirable scaling of the tuyeres for the preheat compartment. The invention thereby provides an increased gas volume in the required temperature range for driving off the excess moisture and heating the phosphate rock to be calcined.

In carrying out this invention the precooler offgases are in the temperature range of from about 300°C to about 400°C and are mixed with the off-gases of the calcining compartment which are in the temperature range of from about 800°C to about 900°C. The volume relationship of the gas volumes is such as to produce a mixed gas volume having a temperature in the range from about 600°C to about 700°C.

Referring to the drawing, it will be seen that this system for the calcination of phosphate rock consists of a series of fluid bed treatment vessels in which the raw, wet phosphate rock is successively preheated, calcined and cooled. The principal fluid bed vessels are the preheater 30, the calciner 10, the precooler 50 and the after-cooler 70. A hopper 45 is provided for holding phosphate rock. The discharge chute 46 from the hopper 45 is positioned above a belt conveyor 47. The belt conveyor 47 discharges into the port 48 of the preheater 30. The preheater 30 has a constriction plate or dome 34 which separates a windbox 38 from the preheat compartment 32. A conduit 36 is provided for conducting the solid preheated material from the preheat compartment 32 to the calcining compartment of the calciner 10. A conduit 43 leads into the windbox 38 of the preheater 30 to supply heated air for fluidizing and heating the bed material in the preheater. The calciner 10 has two fluid bed treatment regions, the first of which is the calcining compartment 16 having circumferentially arranged fuel guns 11. The calcining compartment 16 is separated from the cooling compartment 19 by the constriction dome 14. Conduit means 13 is provided for gravity movement of calcined material from calcining compartment 16 to cooling compartment 19. The fluidizing air required for compartments 19 and 16 enters the windbox 17 through the conduit 21. The off-gases from the calcining compartment 16 exit through conduit 41 which conducts the off-gases to the hot cyclone 42 where the solids are separated and leave at the apex of the cyclone through conduit 44 while the hot gases move upward toward the preheater 30 through the conduit 43. The conduit 61 for solids is open to the cooling compartment 19 in the calciner 10 and discharges into the precooler 50. Fluidizing air for the precooler 50 is admitted into the windbox 53 thereof through the conduit 55. A conduit 66 is provided for accommodating the off-gases of the precooler and is connected to the conduit 41 leading from the calciner 10. A solids conduit 62 is connected to the precooler 50 and discharges into the after-cooler 70. Fluidizing gas for the after-cooler 70 is conducted into the windbox 73 through the conduit 75. The after-cooler 70 is also provided with water cooling means comprising water line 82 which passes through the side wall 72 of the after-cooler to supply a spray head 83. The off-gases from the after-cooler are conducted to the stack through conduit 78. Cooled product is removed through conduit 87 and received in storage container 95.

In carrying out the process of the invention with the system shown in the drawing, phosphate rock having a moisture content in excess of 12% by weight is introduced into the preheat compartment 32 of the preheater 30 by the conveyor belt 47 which carries the phosphate rock from the discharge chute 46 of the hopper 45 to the port 48 of the preheater 30. The phosphate rock feed is composed of a range of particle sizes up to about one-half inch in diameter and is fluidized in a bed supported by the constriction dome 34. Hot fluidizing air, in part from the calciner 10, is introduced to the hot windbox 38 through the conduit 43. The dried phosphate rock product at a temperature of about 120°C flows from the fluidized bed in the preheat compartment 32, under the influence of gravity, through the conduit 36 which discharges into the calcining compartment 16 of the calciner 10.

In the calcining compartment 16 a fluidized bed of phosphate rock undergoing treatment is supported by the constriction dome 14. The fuel guns 11 arranged circumferentially of the calciner 10 inject fuel directly into the fluidized bed in the calcining compartment, where the fuel is burned and maintains the fluidized bed at a temperature of about 850°C. The off-gases from the calcining compartment 16 leave through the conduit 41 which feeds into the hot cyclone 42 where solids and dust are separated and disposed to waste or report as finished product through the apex of the hot cyclone and line 44. The hot gases then travel through conduit 43 to the hot winbox 38 of the preheater 30. Calcined phosphate rock from the calcining compartment 16 of the calciner 10 leaves the fluidized bed at a temperature in the range from about 800°C to about 900°C, say 850°C, through the conduit 13 to the cooling compartment 19. Fluidizing air enters the cold windbox 17 of the calciner, passes through the constriction plate 18 and fluidizes the bed in the cooling compartment 19 and, in the process, the air is heated to a temperature of about 550°C and then travels upwardly through the constriction dome 14 to fluidize the treatment bed in the calcining compartment 16. The calcined phosphate rock in the cooling compartment 19 is cooled to a temperature in the range from about 400°C to about 600°C, say 540°C, before leaving the compartment, and then moves through the conduit 61 which discharges into the precooler 50.

In the precooler 50, fluidizing air at ambient temperature is fed through conduit 55 into the cold winbox 53 of the precooler. The air passes up through the constriction plate 54 where it fluidizes the phosphate rock undergoing cooling. The phosphate rock in the precooler is cooled to a temperature in the range from about 300°C to about 400°C, say 360°C, and the fluidizing air achieves essentially that same temperature. The off-gases of the precooler, now at a temperature of about 360°C, move through conduit 66 to discharge into conduit 41, and there mix with the off-gases of the calciner 10. The gases mix in the conduit 41 to produce an increased volume of gas at a temperature of from about 600°C to about 700°C, say 650°C, and this is the gas which moves through the hot cyclone and the conduit 43 to fluidize the bed in the preheater 30. In effect, a volume of hot gas substantially greater than that produced by the calciner has thus been provided for evaporating the higher moisture content of the phosphate rock and heating the rock to the desired preheat temperature. While additional heat has thus been added to the fluidizing gases for the preheater 30, the temperature of the off-gases of the calciner has nevertheless been reduced to a level at which excessive scaling of the tuyeres of the constriction dome 34 of the calciner will not occur.

The phosphate rock in the fluidized bed of the precooler 50 moves under the influence of gravity through conduit 62 which discharges into the after-cooler 70. Fluidizing air passes into the windbox 73 of the after-cooler from the conduit 75 and then through the constriction plate 74 into the cooling compartment 72 where it fluidizes the phosphate rock for final cooling and then passes through the conduit 78 to the stack. A water conduit 82 passes through the side wall of the after-cooler 70 to a spray head 83 positioned for spraying the fluidized bed. The cooled phosphate rock product is then discharged through the conduit 87 for use in production of phosphoric acid or for various fertilizer products.

In cases where very high moisture content (over 16% by weight of water) phosphate rock feed must be employed, particularly non-deslimed rock, an auxilliary source of hot air may be required for preheater 30. The system shown in the FIGURE therefore includes an air heater 98 which can supply a substantial flow of air at a temperature of about 650°C through conduit 97 into the windbox 38 of the preheater 30 to aid in evaporation of the water and to heat the phosphate rock to the desired temperature level.

For the purpose of illustrating the advantages of the invention to those skilled in the art, the following examples are given:

EXAMPLE I

In a system of the type shown in the FIGURE, about 60 MTPH (Metric Tons Per Hour) of calcined phosphate rock is produced. About 74.7 MTPH of non-deslimed phosphate rock containing an average of 18% by weight of water is added to the preheater through which about 35,500 SCFM (Standard Cubic Feet Per Minute — 70°F and 14 psia) of fluidizing air at a temperature of 650°C is passed. Of this quantity of air about 15,500 SCFM at 850°C originates at the calciner while 14,000 SCFM at 350°C is routed from the precooler and 6,000 SCFM is contributed by the air heater. The bed diameter of the calciner is 18 feet. If all of the gas for preheating the moist phosphate rock had to be passed through the calciner, a minimum bed diameter of at least 26 feet would have been required with corresponding increases in the other dimensions of the calciner and of the preheater, as well as requiring substantial additional quantities of fuel for heating the gas. Thus, a conventional system of this capacity would consume about 35 pounds of oil per metric tone of product whereas a system of this capacity employing this invention would consume only about 15 pounds of oil per metric ton of product.

EXAMPLE II

The system shown in the FIGURE was also operated using a deslimed phosphate rock feed containing about 15% by weight of water to produce 60 MTPH of calcined phosphate rock. In this case, 70.2 MTPH of the deslimed phosphate rock was fed to the preheater with about 29,855 SCFM of fluidizing air at a temperature of 650°C admitted. Of this quantity of air, about 15,340 SCFM at 850°C originates at the calciner while about 14,000 SCFM at 350°C is routed from the precooler and 515 SCFM from the air heater at 650°C. With this lower moisture content feed, only about 8.5 pounds of oil per minute were required. It is clear that in this Example only a small amount of additional heated air is introduced by the auxiliary air heater. With a phosphate rock feed containing 14% moisture or less, the auxiliary air heater will not be required at all.

It is thus seen that the present invention permits the treatment of phosphate rock having a high moisture content without unduly increasing capital costs and consumption of fuel.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for calcining phosphate rock containing 12% or more by weight of water while minimizing scaling in which the phosphate rock is moved serially through a plurality of fluidized beds to accomplish preheating, calcination and at least two stages of cooling, comprising the steps of, fluidizing a primary cooling bed with air from a first source of pressurized air to cool the phosphate rock, conducting the heated off-gases of said primary cooling bed to the calcination bed as the fluidizing gas therefor, passing the calcined, partially cooled phosphate rock from said primary cooling bed to a secondary cooling bed, fluidizing said secondary cooling bed with air from an independent second source of pressurized air to further cool the phosphate rock, the fluidizing air stream for said secondary cooling bed flowing in parallel with the fluidizing air stream for said primary cooling bed and said calcination bed, mixing the high-temperature off-gases from the calcination bed with the cooler off-gases of said secondary cooling bed and conducting the mixed gases to the preheating bed as the fluidizing gas therefor.

2. The calcination process of claim 1 wherein the temperature of the calcination bed off-gases is in the range from about 800°C to about 900°C and the temperature of the fluidizing gases for the preheating bed is in the range from about 600° to about 700°C.

3. The process of claim 2 wherein the temperature of the off-gases from the secondary cooling bed is in the range from about 300°C to about 400°C.

4. The process of claim 3 wherein there are three cooling fluid beds and in the final cooling bed water is sprayed directly on the fluidized bed.

5. The process of claim 3 wherein air at a temperature of from about 600°C to about 700°C is supplied from an auxiliary source to supplement the fluidizing gases for the preheating bed.

6. A process for calcining phosphate rock containing 12% or more by weight of water in which the phosphate rock is moved through a succession of fluid beds for treatment, including a fluid bed preheating stage, a fluid bed calcination stage producing a calcined product at a temperature of about 850°C and off-gases at substantially the same temperature and a plurality of fluid bed cooling stages, comprising the steps of fluidizing a primary cooling bed with air from a first source of pressurized air to cool the phosphate rock to a temperature of about 540°C, conducting the off-gases of said primary cooling bed at a temperature of about 540°C to the calcination bed as the fluidizing gas therefor, fluidizing a secondary cooling bed with air from an independent second source of pressurized air to cool the phosphate rock to about 350°C, the air flow in the secondary cooling bed being in parallel with the air flow in the primary cooling bed and the calcination bed, mixing the off-gases of the secondary cooling bed at a temperature of about 350°C with the high-temperature off-gases from the calcination bed and conducting the mixed gases at a temperature of about 650°C to the preheating bed as the fluidizing gas therefor and as the medium for preheating the phosphate rock to evaporate the moisture associated therewith.

7. The process of claim 6 wherein air at a temperature of about 650°C is supplied to the preheater from an auxiliary air heater to supplement the fluidizing gases for the preheating bed.

* * * * *